March 4, 1958 P. E. GATES 2,825,856

SEALED SEMICONDUCTOR DEVICES

Filed May 29, 1953

INVENTOR
PAUL E. GATES

BY Paul S. Martin
ATTORNEY 2,825,856

SEALED SEMICONDUCTOR DEVICES

Paul E. Gates, Danvers, Mass., assignor to Sylvania Electric Products Inc., a corporation of Massachusetts Application May 29, 1953, Serial No. 358,335

5 Claims. (Cl. 317—234)

The present invention relates to the fabrication of semiconductor devices, and particularly to rectifying-contact diodes and other semiconductor translators and transducers having a heat-sealed enclosure affording long-term stability.

In typical manufacture of semiconductor units, one or more rectifying-contact elements are arranged in contact with the semiconductor element. These elements are provided with a casing or enclosure rendered airtight by various sealing arrangements, such as force fits, integrally-cast plastic bodies, and heat seals. The need for good seals becomes apparent when it is considered that production of leaky or faulty joints or seals allows atmospheric attack on the relatively sensitive semiconductor element and renders such semiconductor units sensitive to atmospheric change, both of which contribute substantially to unstable semiconductor characteristics and failure with time.

From the production viewpoint, fabrication procedures should facilitate reprocessing of defective units, salvaging of most component parts, minimum risk in damaging the semiconductor surface, and ease of handling the exceptionally tiny units, often having a maximum casing dimension less than 3/8".

Accordingly, it is an object of the present invention to provide novel semiconductor devices of simplified physical constructions having one or more of the aforesaid advantages. In particular, it is within the contemplation of the invention to provide rectifying-contact devices adapted to manufacture by mass production techniques, and facilitating the formation of heat-sealed and airtight enclosures without detracting from stability or the obtaining of desired semiconductor properties.

In accordance with one aspect of the invention an improved semiconductor device is provided in which the rectifying-contact and semiconductor elements are mounted within a bipartite casing including a hollow glass body and a glass plug. An annular sealing ring advantageously of a glass-to-metal sealing alloy is bonded to the body and the plug that are sealed to each other. The bond between the glass body and the glass plug is effected indirectly, by induction heating of the sealing ring. In this way the troublesome effects of the sealing flame are avoided, that would otherwise be required; consequently the combustion products in the flame, including harmful water vapor, are excluded from the region.

The nature of the invention will be best appreciated from the following detailed description of an illustrative embodiment, when taken in conjunction with the accompanying drawing, wherein.

Figure 1:
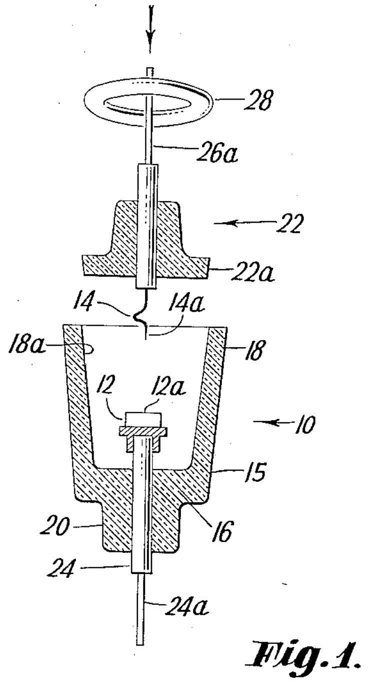
Fig. 1 is an exploded assembly view of an illustrative rectifying-contact diode embodying features and partially processed in accordance with certain aspects of the present invention.

Although the invention has been illustrated in conjunction with a crystal diode, it is to be expressly understood that other applications are contemplated, as and for example, photo-detectors, and transistor units or semiconductor triodes. In the drawing, a bipartite envelope or casing 10 is arranged to receive properly supported semiconductor and point-contact rectifying elements, respectively designated by the numerals 12, 14. The envelope or casing is illustrated as being fabricated of glass, as a matter of convenience, but it is to be understood that vitrified ceramic materials are well known broad substitutes intended to be included where the term "glass" is used. The envelope 10 includes a body 15 having an end wall 16, a frustro-conical wall 18 extending in one direction from the end wall 16, and a lead supporting head 20 extending in the opposite direction from the end wall 16. The inner surface 18*a* of the frusto-conical wall 18 flares outwardly from the end wall 16 and terminates in an open mouth.

Traversing the open mouth of the body 10 is a glass plug or circular base 22 preferably having its outer periphery 22*a* slightly tapered to be complementary with the taper of the inner conical wall 18*a* of the body 15. The cross-section of the plug 22 is selected with respect to the internal cross-section of the body 15 to seat at a particular level with respect to the end wall 16 of the body, for a purpose which will subsequently become apparent.

Integrally molded with the end wall 16 of the body 10 and extending axially through the supporting head 20 is a lead 24 which has one end projecting exteriorly of the body and has its opposite end terminating within the body adjacent the end wall 16. Secured to or formed integrally with the lead 24 is a platform or the like upon which the semiconductor element 12 is fixed by an appropriate ohmic connection. The end of the lead externally of the body 10 is integrally formed with a reduced pin or terminal prong 24*a* for suitable circuit connections to the supporting lead 24 in a manner minimizing transmission of mechanical stress to the wall 18 of the body 10.

The plug or base 22 is molded with a lead 26 adapted to be arranged in axial alignment with the lead 24 upon insertion of the plug 22 within the body 15. The lead 26 includes a reduced pin or terminal prong section 26*a* integral therewith for suitable connection to desired electrical circuits. The end of the lead 26 remote from the terminal prong 26*a* carries the point-contact element 14 which is formed of a transversely extending resilient whisker of an appropriate metal having a prepared point 14*a* for engagement with a prepared surface 12*a* of the semiconductor element 12. The prepared point 14*a* engages the semiconductor surface 12*a* when the plug is seated within the conical wall 18 traversing the open mouth of the body 10.

In order to provide an effectively hermetically sealed unit, a ring of a suitable glass-to-metal sealing alloy is positioned on the glass plug 22 in contact with the extremity of the outwardly tapered conical surface 18*a*. In order to promote centering of sealing ring 28, the plug is reduced as indicated at 30 to provide a lateral shoulder 22*b* which defines the bottom wall of an annular channelway for the ring 28, the curved side walls being defined by the plug proper and the confronting inner peripheral surface of the body 15. As is apparent to those skilled in the art, heating of the sealing ring, which may be accomplished by indirect heating, as by the induction heating coil C, without the need of solder or flux, is effective to form a continuous fused-glass joint or seal between the plug 22 and the complementary surface of the seat 18*a*.

Figure 3:
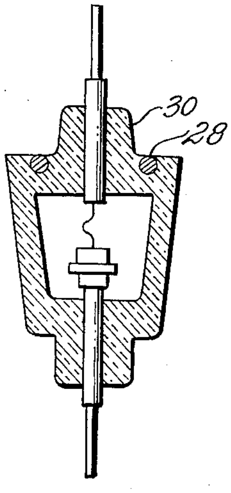
Fig. 3 is an elevational view in partial section showing a completed diode processed in accordance with the present invention.
Figure 2:
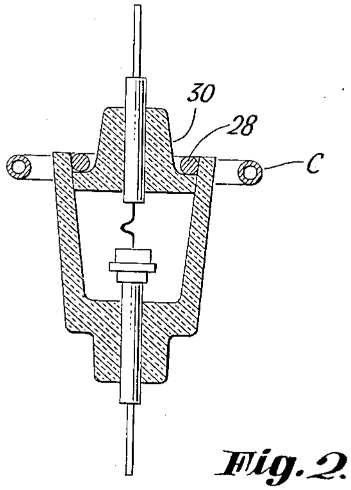
Fig. 2 is an elevational view in partial section of parts of a diode in position for the final sealing step in accordance with the present invention.

Semiconductor devices, such as the illustrative rectifying-contact diode, are processed in substantially the following manner:

The circular plug or base 24 of the bipartite housing 10 is integrally molded with the lead 26 supporting the point-contact element 14, conveniently in a conventional radio-tube heater molding machine. Likewise the body 10 of an appropriate glass, ceramic, or moisture-proof plastic is molded with the lead 24 supporting the semiconductor element 12. Thereupon the plug 22 is seated within the body 10 traversing the open mouth thereof and the sealing ring 28 is brought into the annular channelway 30 defined by the cooperating body and plug. Preferably, the body 15 is supported in an upright position, as shown, by a temporary jig, and the plug is dropped into the body to the seating position. Initial dimensioning of the components is selected to obtain the desired electrical characteristics, which may be checked by concurrent electrical testing during assembly. Thereupon the sealing operation is brought about by inductive heating which avoids exposing the semiconductor to direct heat, or the products of combustion. The unit thus formed, as shown in Fig. 3, is hermetically sealed and there is no need for complicated jigs or fixtures for carrying out the assembly operation.

Furthermore the assembly may be accomplished in a vacuum or in a rare-gas atmosphere so that the completed unit would be evacuated or filled with a rare gas without incorporating a special exhaust and filling tube in the construction of the bipartite envelope.

While in accordance with the provisions of the statutes, I have illustrated and described the presently preferred form of my invention, it will be apparent to those skilled in the art that changes may be made in the device and method disclosed without departing from the spirit of the invention, as set forth in the appended claims, and that in some cases, certain features of my invention may be used to advantage without a corresponding use of other features.

What is claimed is:

1. The method of manufacturing hermetically sealed devices, which includes the steps of forming a semiconductor rectifying connection within a pair of glass housing members assembled to have opposed portions, applying a conductive metal ring to the opposed portions of said pair of glass members, and induction-heating said ring to thereby form a fused hermetic seal between said glass members and uniting said ring to said fused glass members.

2. The method of manufacturing hermetically sealed devices, which includes the steps of forming a semiconductor rectifying connection within a pair of glass housing members assembled to have opposed portions, applying a conductive metal ring to the opposed portions of said pair of glass members, and induction-heating said ring to thereby form a fused hermetic seal between said glass members and uniting said ring to said fused glass members in an atmosphere free of water vapor.

3. In a semiconductor device including semiconductor and rectifying-contact elements in contact with each other, an envelope enclosing said elements comprising a fusible body portion heat sealed to a fusible closure portion and a conductive metal element capable of being heated by induction heating lying in the zone of the seal joining said envelope portions, said metal element being sealed to both of said portions.

4. In a semiconductor device including a semiconductor element and at least two contacts cooperating with said semiconductor element, an air-tight envelope enclosing said element and contacts comprising two glass portions and a conductive metal element of glass-to-metal sealing alloy capable of being heated by induction heating, said glass portions being fused together and said metal element being sealed to both of said portions in the zone of fusion joining said glass portions.

5. In a semiconductor device, semiconductor and rectifying-contact elements in mutual contact, a glass envelope enclosing said elements, including a body portion having an end wall and side walls, and a closure sealed by fusion to the side walls of said body portion at the opposite end thereof from said end wall, means including a lead extending externally of said end wall for supporting one of said elements, means including a second lead extending through said closure and externally of said envelope for supporting another of said elements, and a conductive metal ring of glass-to-metal sealing alloy lying in the zone of the seal joining said body and closure portions and sealed to both of said portions.

References Cited in the file of this patent

UNITED STATES PATENTS

| | | |
|---|---|---|
| 2,297,492 | Michaelis | Sept. 29, 1942 |
| 2,595,475 | McLaughlin | May 6, 1952 |
| 2,626,985 | Gates | Jan. 27, 1953 |
| 2,633,489 | Kinman | Mar. 31, 1953 |